United States Patent [19]
Burdette, Jr. et al.

[11] 3,739,349
[45] June 12, 1973

[54] DIGITAL EQUIPMENT INTERFACE UNIT

[75] Inventors: William M. Burdette, Jr., Largo; David C. Davis, Jr., Clearwater, both of Fla.

[73] Assignee: Sperry Rand Corporation, New York, N.Y.

[22] Filed: May 24, 1971

[21] Appl. No.: 146,263

[52] U.S. Cl............................... 340/172.5, 324/73
[51] Int. Cl............................................ G01r 31/00
[58] Field of Search ................ 340/172.5; 235/157; 324/73 R, 73 AT

[56] References Cited
UNITED STATES PATENTS

| | | | |
|---|---|---|---|
| 3,602,809 | 8/1971 | Tarvi et al............................ | 324/73 R |
| 3,585,599 | 6/1971 | Hitt et al............................. | 340/172.5 |
| 3,311,890 | 3/1967 | Waaben .............................. | 340/172.5 |
| 3,478,286 | 11/1969 | Dervan .............................. | 340/172.5 |
| 3,576,541 | 4/1971 | Kwan et al.......................... | 340/172.5 |
| 3,505,598 | 4/1970 | Merrill................................. | 324/77 |
| 3,490,041 | 1/1970 | Shapiro et al...................... | 324/73 R |
| 3,549,996 | 12/1970 | Vaughan............................. | 324/73 R |

Primary Examiner—Paul J. Henon
Assistant Examiner—Mark Edward Nusbaum
Attorney—S. C. Yeaton

[57] ABSTRACT

A programmable interface unit for use with automatic digital test equipment having a plurality of generator/comparator units which couple stimuli signals from a plurality of shift registers to a unit under test and evaluate output signals produced by the unit under test in response to the stimuli signals by comparing the output signals to programmable reference levels. Each terminal of the interface unit coupled between the generator/comparators and the unit under test may be employed alternately by appropriate programming to function as either a stimuli output to the unit under test or as an input to a comparator of an output signal produced by the unit under test.

9 Claims, 2 Drawing Figures

DIGITAL EQUIPMENT INTERFACE UNIT

BACKGROUND OF THE INVENTION

1. Field of the Invention

This invention pertains to a class of equipment used in testing digital electronic apparatus and specifically to automatic equipments which perform a plurality of tests that heretofore required many different interface elements between the test equipment and the apparatus under test.

2. Description of the Prior Art

In the prior art, a Program Storage and Routing (PSR) card is utilized to interface between a specific unit of a system under test and the automatic test equipment. The output lines on the PSR card couple programmable power supplies to the unit from the test equipment. These lines include the required voltage levels and their respective returns. To standardize the design of the cards, certain output terminals on each card are reserved for specific voltage levels. Other signals coupled between the unit under test and the test equipment include digital ones and zeroes referred to as stimuli signals, clear pulses, clock frequency signals and output signals generated by the unit under test in response to the stimuli signals. A particular PSR card could be used for one or possibly two tests because the terminals on each unit require the coupling of different types of signals to and from the test equipment. Therefore, each PSR card is designed to accommodate the performance of particular tests of specific units. As the number of different units and the number of different tests to be performed increases, the number of PSR cards required also increases. It can be appreciated that the setup time for testing is increased, thereby decreasing the efficiency of the automatic test equipment. Further, storage capacity is necessitated in order to accommodate the multiplicity of PSR cards.

SUMMARY OF THE INVENTION

The present invention is an interface unit which couples a plurality of different signals on the same output terminals between automatic test equipment and units to be tested. This interface unit includes a decoder which processes received stimuli data inputs and applies the decoded stimuli outputs through parallel connected shift registers to a stimuli latch circuit. Programmed bit inputs are applied to a plurality of bit latch circuits that provide control outputs. Generator/comparator circuits each of which includes a transistorized switch and a pair of integrated circuit comparators receives input signals from the stimuli latch circuit and control signals from the bit latch circuits. The output of the transistorized switch and the inputs to the pair of integrated circuit comparators in each generator/comparator are connected in common with one output terminal of the interface unit. Thus, as a function of time, an output terminal of the interface assembly may couple a stimuli signal to the unit under test and subsequently couple an output signal from the unit under test into the integrated circuit comparators. The stimuli signals may be digital ones or zeroes, clear pulses or clock frequency signals. Therefore, this device provides a single unit that obviates the need for a multiplicity of interface or Program, Storage, Routing (PSR) cards thereby enabling an increase in testing efficiency while reducing testing complexity and cost without any degradation in the accuracy of the test measurements obtained.

DESCRIPTION OF THE PREFERRED EMBODIMENT

Figure 1A:
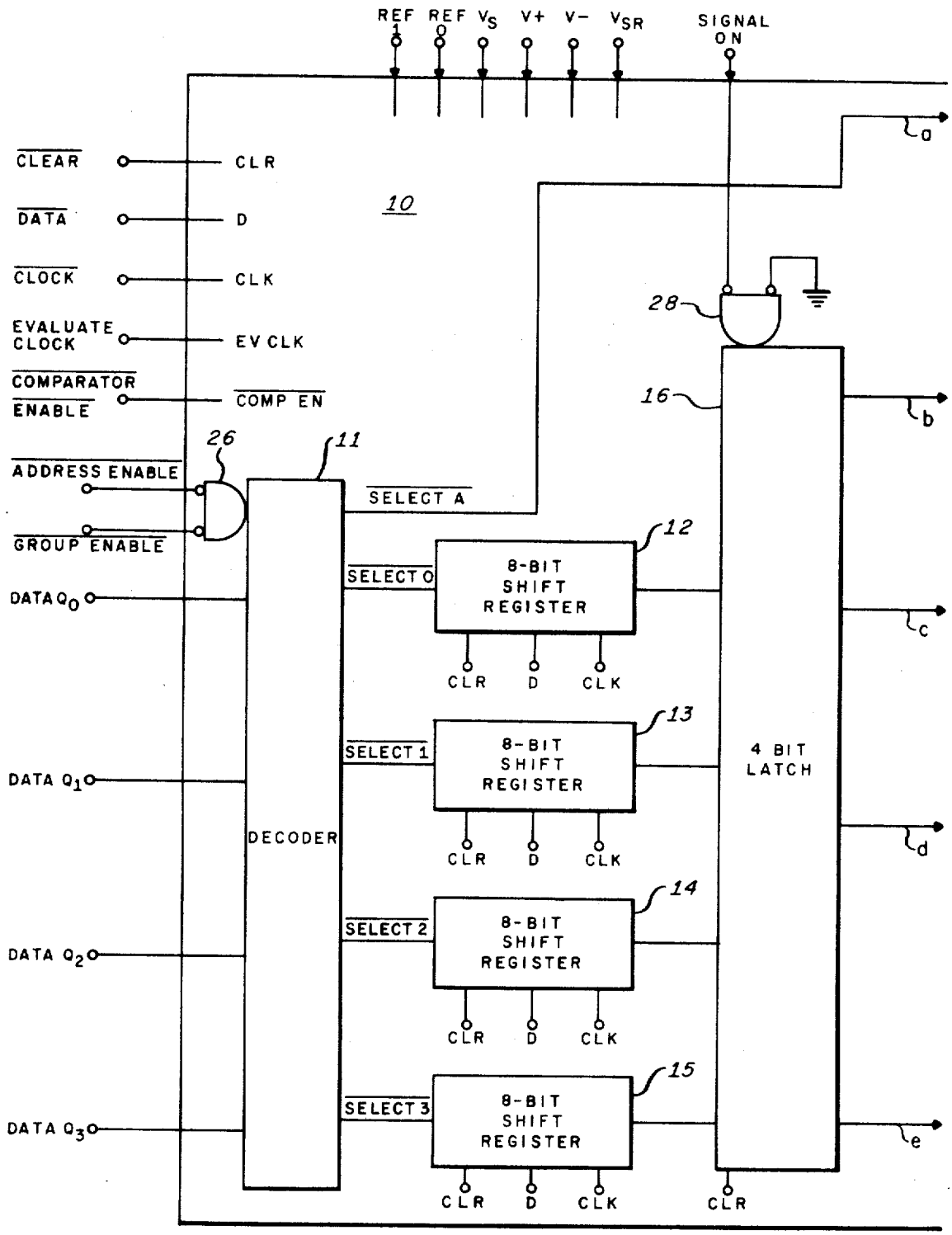
FIG. 1a and FIG. 1b combine to form a block diagram of the digital interface device including a schematic diagram of two generator/comparator circuits.
Figure 1B:
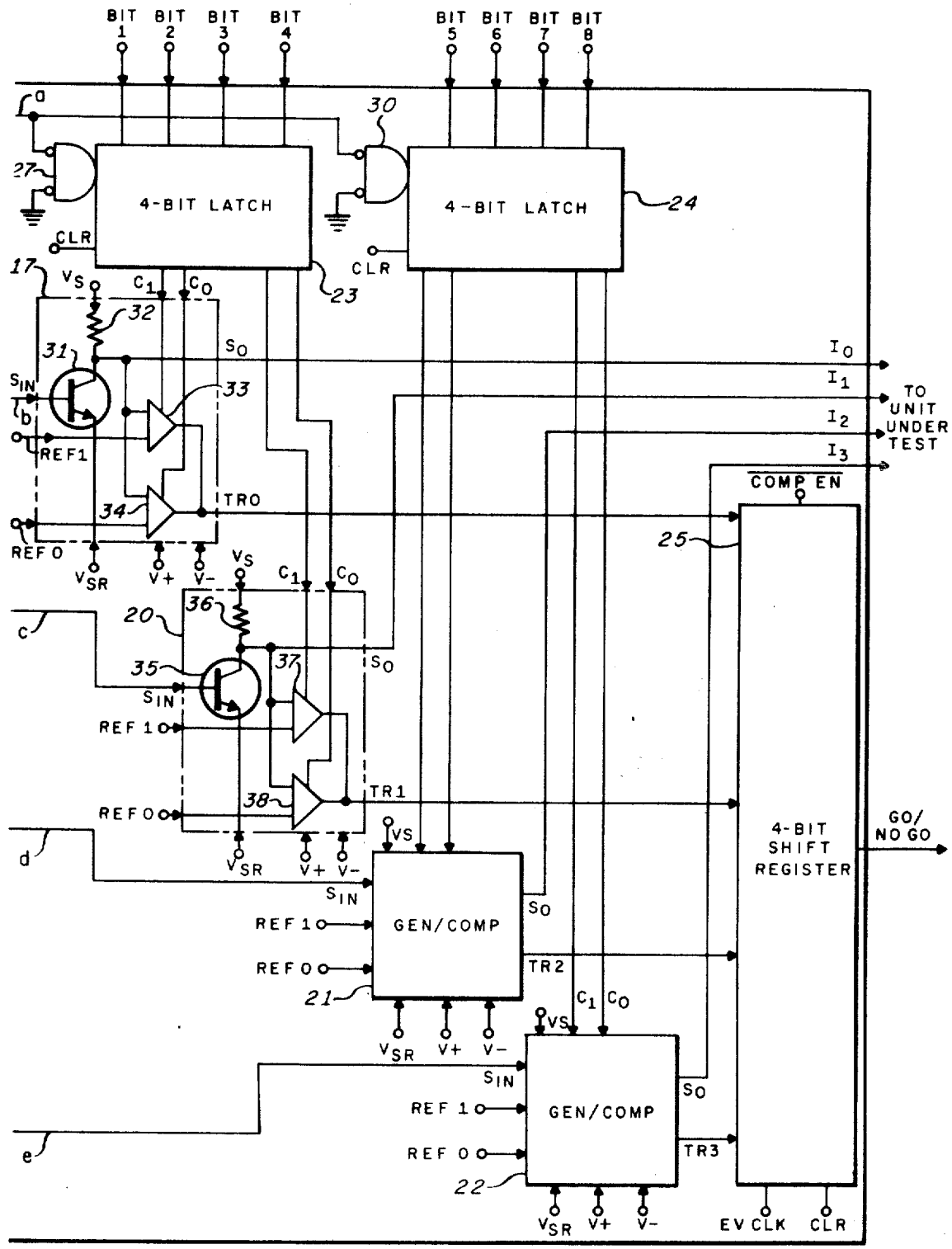

Referring to the FIGURE, an interface device 10 includes a decoder 11 which may be an integrated circuit element that converts a digital number appearing on the inputs DATA $Q_0$, DATA $Q_1$, DATA $Q_2$ and DATA $Q_3$ into a pulse output on one of the lines $\overline{\text{SELECT 0}}$, $\overline{\text{SELECT 1}}$, $\overline{\text{SELECT 2}}$, or $\overline{\text{SELECT 3}}$. The decoder 11 is coupled via the select lines to a plurality of eight bit shift registers 12, 13, 14 and 15. Each of the shift registers has input terminals which receive DATA, CLOCK and CLEAR inputs, respectively. In addition to its corresponding select input, the output terminal of each shift register 12–15 are connected to respective input terminals on a four bit latch circuit 16 which is a delay circuit responsive to external gating. Output stimuli signals from that latch circuit 16 designated $S_{in}$ are coupled into corresponding comparator/generator circuits 17, 20, 21 and 22 which are identical schematically to 17 and 20 shown within the dashed lines in the figure. A further line designated $\overline{\text{SELECT A}}$ is connected to input gates 27 and 30. The signal on the $\overline{\text{SELECT A}}$ line is derived from the inputs $\overline{\text{ADDRESS ENABLE}}$ and $\overline{\text{GROUP ENABLE}}$ gated into the decoder 11 by a gate 26. Each stimuli signal, $S_{in}$, is applied to the base of a switching transistor, for example, transistor 31. The collector of the transistor 31 is coupled through a collector resistor 32 to a supply voltage Vs and the emitter of the transistor 31 is connected directly to a return for the supply voltage designated Vsr. An output stimuli signal, $S_o$, is obtained from the junction of the collector resistor 32 and the collector of transistor 31. The output stimuli signal is applied to an output terminal, $I_o$, which is connected to a terminal on a unit under test as indicated by the leader in the figure.

Each of the comparator/generators also receives control inputs $C_0$ and $C_1$ from either of the four bit latch circuits 23 or 24. These control inputs enable the operation of one of the two comparators in each comparator/generator, for example, comparator 33 or 34 in comparator/generator 17. The latch circuits 23 and 24 are similar to the 4 bit latch circuit 16 in that they are delay circuits responsive to external gating. The state, 0 or 1, of the programmable bits 1 through 8 determine the state of the respective control inputs $C_0$ and $C_1$ that are applied to the comparators through the latch circuits 23 and 24.

Programmable reference voltages REF 1 and REF 0 are applied to reference input terminals on the respective comparators. REF 1 is the minimum allowable level for a one or high level and REF 0 is the maximum allowable level for a zero or low level. These levels may also be selected by appropriate programming. Thus, when $C_1$ enables comparator 33, an output voltage received from the unit under test is compared to REF 1. Alternatively, when $C_0$ enables comparator 34, the output voltage received from the unit under test is compared to REF 0. As a result of this comparison test, either comparator 33 or comparator 34 will provide an output signal TRO indicative of the result of the test. A 4 bit shift register 25 has one input terminal connected to a corresponding output terminal on each of the comparator/generators 17, 20, 21 and 22. Each comparator produces indicator output signals which are applied to the corresponding input terminal on the shift register 25. The indicator signals are processed through the shift register 25 in response to appropriate signals on the $\overline{\text{COMP EN}}$ and EV CLK lines thereby producing a GO/NO GO signal output from the interface unit 10 for each input received from the comparators.

In operation, consider a test to be performed on two different units. On the first unit under test, a stimuli signal $S_o$ is required from the output terminal $I_o$, and the unit under test provides an output signal to the interface device 10 $I_1$. As determined from the bit data inputs applied to the interface divide 10, according to Table A, zeroes are required on $\overline{\text{ADDRESS ENABLE}}$, $\overline{\text{GROUP ENABLE}}$, DATA $Q_0$, DATA $Q_1$, DATA $Q_2$ and DATA $Q_3$ to obtain a zero on the $\overline{\text{SELECT 0}}$ which will enable its corresponding 8 bit shift register 12.

TABLE A

| Address Enable | Group Enable | $Q_3$ | $Q_2$ | $Q_1$ | $Q_0$ | Select 0 | 1 | 2 | 3 |
|---|---|---|---|---|---|---|---|---|---|
| 0 | 1 | X | X | X | X | 1 | 1 | 1 | 1 |
| 1 | 0 | X | X | X | X | 1 | 1 | 1 | 1 |
| 1 | 1 | X | X | X | X | 1 | 1 | 1 | 1 |
| 0 | 0 | 0 | 0 | 0 | 0 | 0 | 1 | 1 | 1 |
| 0 | 0 | 0 | 0 | 0 | 1 | 1 | 0 | 1 | 1 |
| 0 | 0 | 0 | 0 | 1 | 0 | 1 | 1 | 0 | 1 |
| 0 | 0 | 0 | 0 | 1 | 1 | 1 | 1 | 1 | 0 |

The stimuli signal required on $I_o$ for the test is serial data clocked into shift register 12 on its data input terminal, D. The data input may be a programmable eight bit data word stored in another shift register.

During loading of the shift register 12, the four bit latch circuit 16 prevents the input from being transferred to the comparator/generator 17. When both input terminals of the dual input gate 28 connected to the four bit latch circuit 16 have zeroes applied, the outputs $S_{in}$ follow the inputs from their corresponding shift registers 12–15. Since one input terminal on the dual input gate 28 is connected to ground, it always has a zero applied. Therefore, when a zero is applied to $\overline{\text{SIGNAL ON}}$ terminal, the data transferred to the comparator/generators will follow the state of the input data. Upon application of a one level to the $\overline{\text{SIGNAL ON}}$ terminal, the transferred data will remain in the state of the input data at the time the one level was applied irrespective of further changes in the input data. This condition prevails until a zero is applied to the CLEAR terminal of the four bit latch circuit 16, at which time all the input and output data lines are reset to zeroes.

Thus, prior to loading, a zero is applied to the CLEAR terminal of the four bit latch circuit 16 which produces zeroes on the input and output data lines. Then a one level is applied to the $\overline{\text{SIGNAL ON}}$ input which will maintain the output data lines at zeroes irrespective of further changes on the data input lines. As a result, the stimuli signals which are being stored in the shift register 12 are not transferred through the 4 bit dual latch circuit 16 to the unit under test. After the stimuli signals have been stored in the shift register 12, the test is performed by applying a zero level to the $\overline{\text{SIGNAL ON}}$ input and a CLOCK signal which may be a programmable train of pulses to the CLOCK input terminal. The stimuli signals, $S_{in}$, are coupled into the base of the transistor 31 and the inverter output stimuli signals, $S_o$, are obtained from the collector of the transistor 31. By varying the amplitude of the supply voltage Vs applied to the collector resistor 32, the level of the output stimuli signals $S_o$, can be controlled. The output stimuli signals, $S_o$, are applied to the unit under test through the interface output terminal $I_o$. In response to the applied stimuli signals, $S_o$, the first unit under test will produce an output signal on output terminal $I_1$. This output signal is coupled into the comparator/generator 20 and applied to the inputs of comparators 38 and 37 one of which is enabled by control input $C_0$ or $C_1$, respectively, as determined by the input bits 1 through 4. The input $S_o$ from the unit under test is compared to REF 1 in comparator 37 if $C_1$ is high or it is compared to REF 0 in comparator 38 if $C_o$ is high. The test result of the comparison appears on TR1 and is coupled into the 4 bit shift register 25 when the $\overline{\text{COMP EN}}$ input goes to a zero followed by a transition from a zero to a one on EV CLK. Each output on lines TR0 through TR3 is sequentially coupled into shift register 25. These outputs are shifted through shift register 25 and are produced as GO/NO GO outputs by successive clock pulses. Therefore, if the output signal from the module under test is a one, it is compared to REF 1 in comparator 37 and if it is greater than REF 1, it will produce a GO output signal from the shift register 25 or if it is less than REF 1, it will produce a NO GO output signal. Alternatively, if the output signal from the module under test is a zero, it is compared to REF 0 in comparator 38 and if it is less than REF 0, it will produce a GO output signal from the shift register 25 or if it is greater than REF 0, it will produce a NO/GO output signal.

Since the foregoing test can be interchanged between generator/comparators 17 and 20 on a second unit under test, by simple programming changes, the versatility of this device can be readily appreciated. Further, because the output lines on the interface unit 10 can be employed as either stimuli lines or as comparator lines for coupling outputs from the unit under test to the dual input comparators 17, 20, 21 and 22, it eliminates the multiplicity of interface cards or PSR cards required in previous test equipment interface units.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. An interface device for coupling between electronic test apparatus and equipment under test having a plurality of input/output terminals, each of said input/output terminals to be used as either an output terminal for applying stimuli signals to the equipment under test or as an input terminal for receiving signals produced by said equipment under test, said interface device comprising:

a source of stimuli signals for simultaneously providing a plurality of different stimuli signals, stimuli selector means coupled to said source of stimuli signals for automatically selecting specific stimuli signals to be transferred to said equipment under test via said input/output terminals of said interface device, switching means coupled between said selector means and said interface input/output terminals for controlling the transfer of said stimuli signals from said selector means to said equipment under test, a source of reference signals, control means coupled to said stimuli selector means for producing control signals, and comparator means having first input terminals for receiving said signals produced by said equipment under test from said interface input/output terminals, second input terminals coupled to said source of reference signals and third input terminals coupled to said control means for comparing signals from said equipment under test appearing at said interface input/output terminals to a reference signal selected in accordance with said control signals thereby producing an output signal indicative of the result of said comparison.

2. An interface device as described in claim 1 in which said stimuli selector means includes register means coupled to said source of stimuli signals for storing selected stimuli signals.

3. An interface device as described in claim 2 which includes a delay means responsive to external gating and coupled to said register means for controlling the transfer of said selected stimuli signals stored in said register means.

4. An interface device as described in claim 2 in which said register means includes a plurality of 8 bit shift registers coupled in parallel.

5. An interface device as described in claim 2 in which said stimuli selector means includes decoder means responsive to programmed data input signals and coupled to said register means for providing output selector signals.

6. An interface device as described in claim 5 in which said decoder means includes an integrated circuit device that converts said programmed data input signals in the form of a digital number into corresponding output pulses on respective ones of a plurality of output terminals.

7. An interface device as described in claim 1 in which said source of stimuli signals includes means for simultaneously providing digital ones, zeroes, clock pulses and clock frequency signals.

8. An interface device as described in claim 1 in which said control means includes delay means responsive to programmable bit input signals.

9. An interface device as described in claim 8 in which said delay means includes a plurality of 4 bit latch circuits.

* * * * *